United States Patent
Keshavaraj

(10) Patent No.: US 6,685,215 B2
(45) Date of Patent: Feb. 3, 2004

(54) TWELVE-SIDED POLYGON-SHAPED AIR BAG

(75) Inventor: Ramesh Keshavaraj, LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 131 days.

(21) Appl. No.: 09/478,871

(22) Filed: Jan. 7, 2000

(65) Prior Publication Data
US 2002/0079683 A1 Jun. 27, 2002

(51) Int. Cl.[7] ............................................. B60R 21/16
(52) U.S. Cl. ..................... 280/728.1; 280/731; 428/578
(58) Field of Search ........................ 280/728.1, 730.1, 280/731; 428/577, 578, 81; D5/99; 112/475.08

(56) References Cited

U.S. PATENT DOCUMENTS

| | | | | |
|---|---|---|---|---|
| 2,335,292 A | * | 11/1943 | Messenger | 428/578 |
| 3,960,386 A | * | 6/1976 | Wallsten | 280/731 |
| 3,970,328 A | * | 7/1976 | Wallsten | 280/731 |
| 4,119,050 A | * | 10/1978 | Klein | |
| 4,603,571 A | * | 8/1986 | Wessels | |
| 5,720,234 A | * | 2/1998 | Hammer | 112/475.08 |
| 5,975,571 A | * | 11/1999 | Ford et al. | 280/728.1 |
| 6,142,520 A | * | 11/2000 | Iino et al. | 280/728.1 |

* cited by examiner

Primary Examiner—Brian L. Johnson
Assistant Examiner—Christopher Bottorff
(74) Attorney, Agent, or Firm—Terry T. Moyer; Charlotte C. Wilson

(57) ABSTRACT

A twelve-sided polygon-shaped air bag comprised of fabric for use in vehicle restraint systems and method of manufacture is disclosed. The air bag is constructed from fabric panels in the shape of congruent, twelve-sided polygons, which may be regular dodecagons or dodecagons having alternating short and long sides. The individual panels may be in the form of a single dodecagon, or in the form of two abutting dodecagons. The use of dodecagon-shaped panels allows for economical fabric utilization and increased fabrication efficiency, compared with panels having a circular shape.

25 Claims, 4 Drawing Sheets

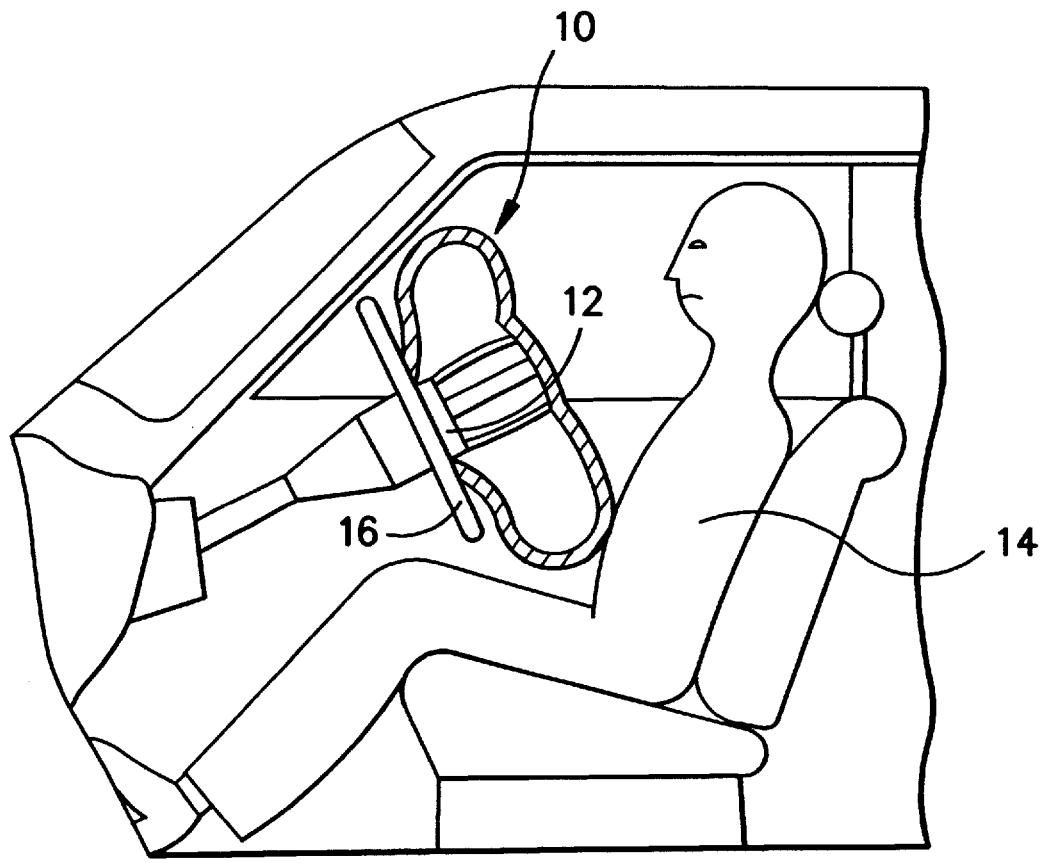
FIG. -1-

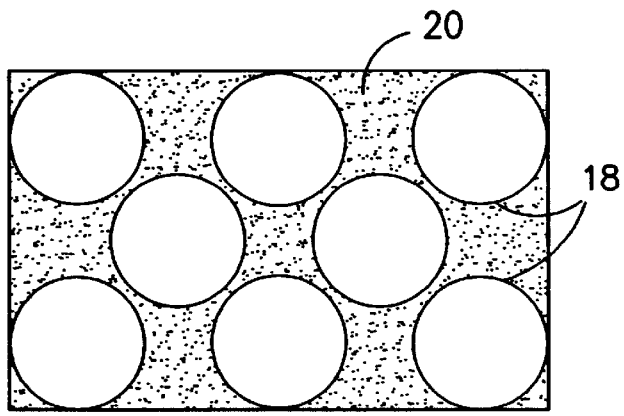
FIG. -2-
PRIOR ART
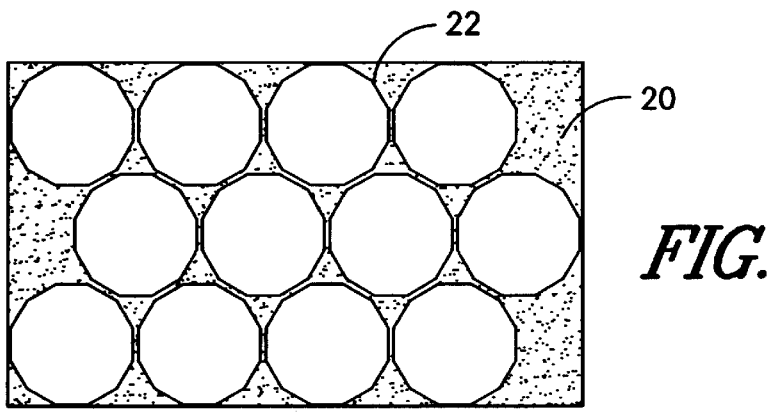
FIG. -3-
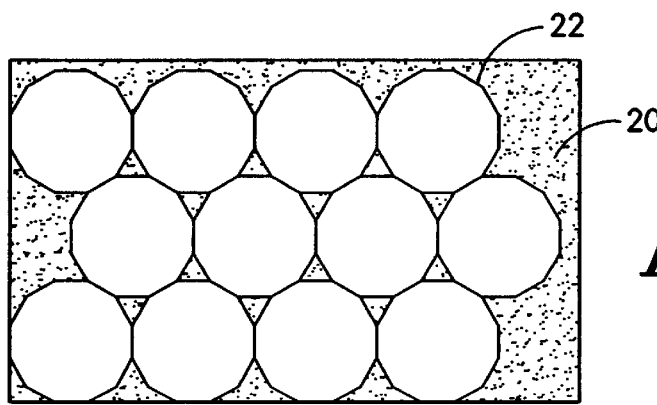
FIG. -3A-

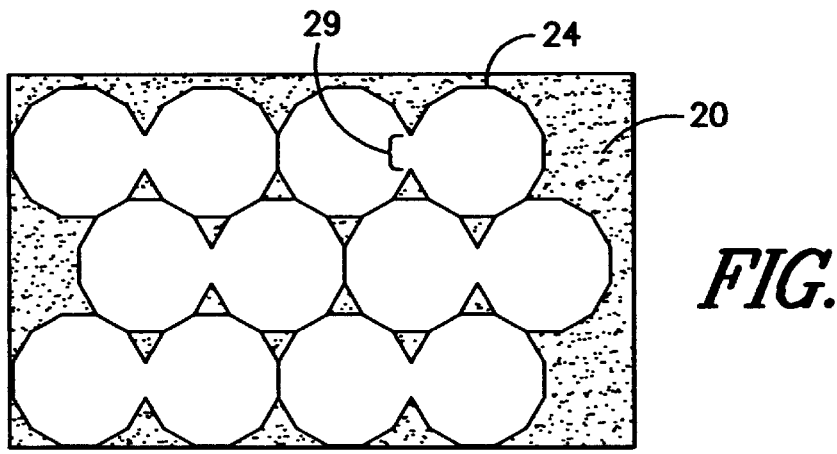
FIG. -3B-
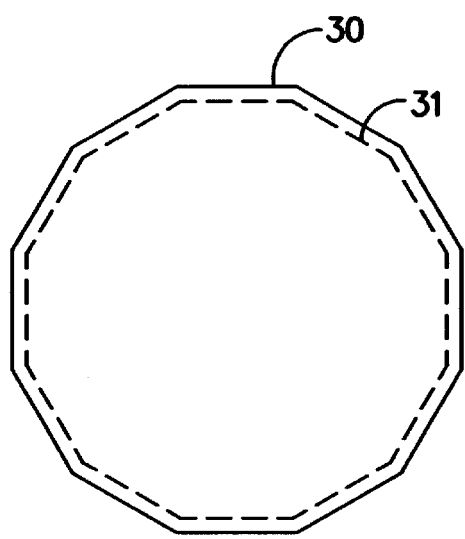
FIG. -4-

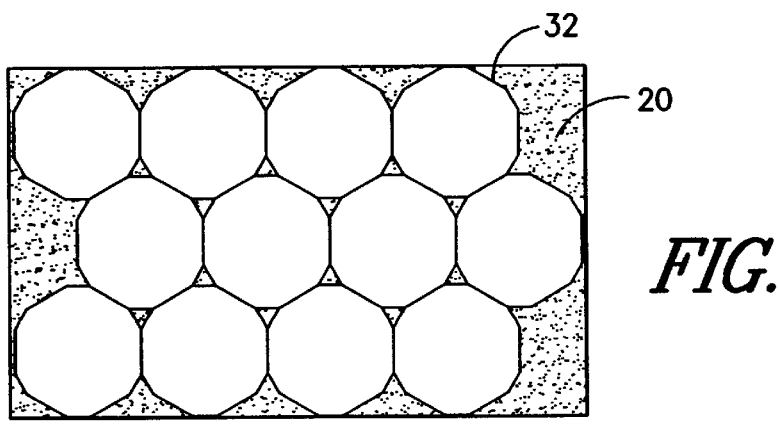
FIG. -5-
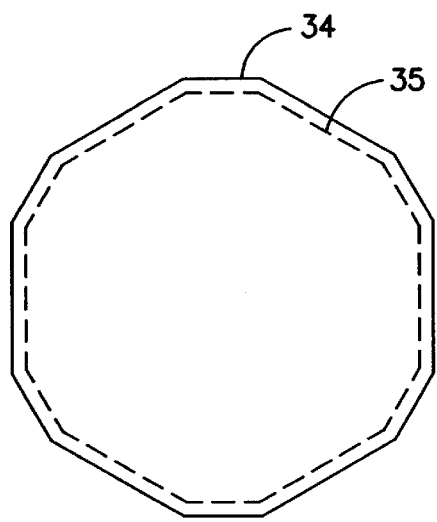
FIG. -6-

TWELVE-SIDED POLYGON-SHAPED AIR BAG

TECHNICAL FIELD

The present invention relates generally to inflatable cushions used in vehicle occupant restraint systems. More particularly, this invention relates to a cushion constructed from fabric in the form of two congruent twelve-sided panels that may or may not share a common side. During the construction process, the panels are superimposed in congruent fashion and joined along their respective coincident edge portions to form a twelve-sided polygonal-shaped cushion.

BACKGROUND ART

An inflatable restraint cushion, or air bag, plays an important role in protecting the occupants of a vehicle from injury due to collision against the car body. Typically, the air bag is disposed within a supporting structure such as a steering wheel, dash panel, door panel, or other fixed portion of a car body in opposed or adjacent relationship to a seat in the vehicle. When inflated rapidly by the pressure of a reaction gas released from an inflator during a collision, the air bag serves as a protective barrier between the vehicle occupant and the steering wheel or other portion of the vehicle body against which the occupant might otherwise be thrown.

Air bags have been used in the past to protect both the vehicle operator and vehicle passengers. Systems for the protection of the vehicle operator are typically mounted in the steering column of the vehicle and utilize cushion constructions that deploy directly towards the driver. These driver-side air bags can be of a relatively simple configuration in that they function over a small, well-defined area between the driver and the steering column. Typically, driver-side air bags are circular or substantially circular in shape when viewed from the front or the back. Such circular air bags are frequently constructed by superimposing, aligning, and joining, along their respective coinciding edges, two generally circular fabric sections that are separately cut from a web or blank of air bag fabric.

It has been found that the amount of fabric used in the finished air bag contributes a large percentage of the costs of air bag production. While circular air bags are functionally effective, the circular shape of the front and back fabric panels from which the air bags are constructed does not lend itself to the efficient utilization of fabric during the manufacturing process. Specifically, the arrangement of these circular panels on a given blank of air bag fabric does not result in efficient fabric utilization or yield. Fabric is wasted in producing such circular cushions since the circular templates do not have straight edges which can be aligned with the edges of the fabric blank or which can be juxtaposed in close proximity on the fabric to provide common or nearly common adjacent edges with minimal fabric waste between neighboring cut sections. Furthermore, because use of circular or other curved panels frequently results in oddly-shaped sections of fabric between neighboring cut panels, utilizing such inter-panel fabric to make other necessary parts of the air bag (e.g., various reinforcements, tethers, doublers, etc.) is often difficult.

An additional problem with circular air bags is the amount of time consumed in the production operations of cutting, joining, and folding such bags. Straight edges, as are found in polygon-shaped panels, are easier to cut and to align for joining. The edges also provide a convenient means for folding the finished air bag into the appropriate shape for mounting into the steering column. The present invention addresses the problems of fabric utilization and production efficiency, in a manner not found in the prior art.

As used herein, it is intended that the following terms be defined as indicated: The term "polygon" is a plane geometric figure having n sides and n vertices. The term "dodecagon" is a plane geometric figure having twelve sides and twelve vertices. A regular dodecagon is an equiangular polygon in which the twelve sides are of equal length. An "Alternating Side Length (ASL) dodecagon" is a symmetrical, twelve-sided polygon in which six sides have a first length and six sides have a second length, the second length being approximately twice as long as the first length, and the sides being arranged in an alternating sequence of short and long sides. A convex polygon is one for which no side, if extended, will enter the polygon. Unless otherwise specified, the term "dodecagon" shall refer to a convex, twelve-sided polygon. The term "congruent" shall be used to mean capable of being superimposed so as to have a perimeter that is coincident throughout. The term "fabric" shall be used in a broad sense to describe any woven or non-woven fabric, film, polymer, combinations or composites thereof, or other suitable material from which the individual panels comprising an air bag may be constructed.

It is common, particularly in air bags designed for the protection of vehicle drivers, to find such air bags fabricated from the seaming or joining of two similarly-dimensioned circular panels along their respective perimeter edges after such circular panels have been cut from a blank of suitable air bag fabric and superimposed in congruent fashion. The instant invention provides for the use of relatively simple polygonal starting geometries for the fabric panels in order to reduce fabric waste by reducing the quantity of fabric between the panels on a fabric blank. Additionally, fabric waste may be reduced because, when such polygons are used, the inter-panel fabric (which might otherwise have to be discarded when circular panels are used) tends to have a straight-sided shape from which the fabrication of other components needed for air bag construction (e.g., reinforcements and the like) may be more easily constructed, thereby saving on the area of uncut fabric blank that must be used in the construction process.

It has been found that fabric utilization can be significantly improved by substituting polygon shapes, and particularly polygons having twelve sides, for the circular-shaped panels of the prior art. In one preferred embodiment, two such panels are individually cut and the cushion is constructed by superimposing the panels in congruent fashion (i.e., with coincident edges) and joining each of the twelve sides of one of the polygon-shaped panels to the respective coincident sides of the other panel. In another preferred embodiment, a single panel is cut in the form of a pair of abutting, congruent twelve-sided polygons that share a common uncut side, i.e., a single, dual-lobed panel, in which each lobe resembles an twelve-sided polygon having eleven cut edges. This single piece panel is then folded about an axis that coincides with the shared uncut side to allow the lobes to be superimposed in congruent fashion. By joining the respective eleven coincident cut edges, a polygonal cushion similar to the two-panel cushion of the first embodiment may be formed, but without the need for a joining operation along the shared side due to the lack of any cut edge.

The polygon shapes can be placed in close proximity to one another on the fabric blank from which they are cut, thus minimizing fabric waste and cost, and providing a useful advancement over the present art. In one embodiment, regular dodecagons are placed in such fashion that the number of sides of any given dodecagon that are coincident with adjacent dodecagons is in the range of two to six, depending on the position of the first dodecagon on the fabric blank. The fabric between polygon-shaped panels (the inter-panel fabric) tends to be in the shape of a triangle, having substantially straight sides, and is therefore easier to utilize in the manufacture of other air bag components (e.g., reinforcements or other components). In a second preferred embodiment, Alternating Side Length (ASL) dodecagons are placed in contiguous relation to one another, such that the number of sides of any given first dodecagon that are coincident with adjacent dodecagons is in the range of two to six, depending on the position of the first dodecagon on the fabric blank. In this embodiment, the inter-panel fabric is also generally triangular in nature due to the coincident sides of the ASL dodecagons, although the triangular inter-panel fabric is smaller than that generated by the regular dodecagons discussed above.

The advantages of the present invention, in all embodiments, include better fabric utilization and an overall simplification of the manufacturing process. By providing congruent polygonal fabric panels having linear edge segments, this invention facilitates seaming operations by improving the ease, effectiveness, and efficiency with which the cut pieces can be aligned and joined during the seam formation process. Prior designs tend either to result in relatively poor material utilization due to the use of unusual panel shapes or to require more complex aligning, folding or sewing operations during the seaming process than is found in the instant invention. The symmetry of the dodecagon-shaped panels makes folding operations simpler than in those air bags in which asymmetrical patterns are used. Accordingly, cost is lowered due to the improved yield per fabric blank as well as the increased efficiency with which the cutting and joining operations can be performed.

All of these advantages apply to the embodiment using two separate twelve-sided congruent polygon panels as well as to the embodiment using a single, dual-lobed panel, with congruent lobes in the shape of the same twelve-sided polygon. However, an additional advantage of the latter embodiment of this invention is the additional simplification in cutting and sewing operations this embodiment provides. Because of the common uncut boundary shared by the twelve-sided polygons comprising the lobes, the number of coincident panel sides or edges requiring joining (after the panel is folded and the lobes are superimposed in congruent fashion) generally is equal to eleven. Sewing along the entire length of the perimeter of the finished air bag is not required due to the presence of an intact section of fabric that forms an uncut transition between the respective lobes that become the face and rear panels of the air bag. The panel is folded along an axis coinciding with the common uncut side between the two polygonal lobes and the two lobes are superimposed in congruent fashion. This folding operation causes the respective cut edges of each lobe to coincide, thereby forming a layered, twelve-sided polygon having only eleven cut sides. Sewing is required on only the eleven cut sides of the folded panel. Each reduction in the number of sewn seams reduces the opportunity for rupture along a seam area, and reduces the number of necessary manufacturing steps. Accordingly, this invention, in each of its embodiments, is believed to represent a useful advancement over the present art.

SUMMARY OF THE PREFERRED EMBODIMENTS

The present invention relates to an air bag suitable for use in a vehicle occupant restraint system, wherein the panels that comprise the air bag are in the shape of a twelve-sided polygon. The panels may be cut separately from a fabric blank, or positioned in such fashion that the panels share a common side and create a dual-lobed figure. The use of dodecagon-shaped panels improves fabric utilization and fabrication efficiency, as compared with conventional circular panels.

In view of the foregoing, it is an object of this invention to provide an air bag that can be formed from fabric panels that are cut from a fabric blank with a minimum amount of wasted fabric. The blank may be of woven or non-woven fabrics, films, or combinations or composites thereof, as may be prescribed by those skilled in the art.

It is another object of this invention to provide a vehicle occupant restraint cushion or air bag that can be formed from two twelve-sided polygonal panels, or from a single panel comprised of two abutting polygonal lobes, without the need for any additional attachments, shape-forming members, or reinforcements to define the surface of the air bag.

It is yet another object of this invention to provide an inflatable restraint cushion that, in one embodiment, is comprised of two congruent polygon-shaped fabric panels in the shape of a dodecagon, where the number of sides in each panel is twelve. The panels are superimposed and aligned in congruent fashion to make the twelve edges coincident. The edges are then joined along their respective twelve cut sides by a perimeter seam comprised of a series of easily sewn, substantially straight seams. There is no need to fold either of the panels prior to the formation of the perimeter seam, and no need to orient the perimeter seam with respect to any fold line that may be used to facilitate storage of the uninflated air bag in an operative position within the vehicle.

It is yet another object of this invention to provide an inflatable restraint cushion that, in a separate embodiment, is comprised of two congruent polygonal-shaped fabric panels in the shape of an Alternating Side Length dodecagon, where the ratio of the length of the short sides to the length of the long sides is approximately one to two. The panels are superimposed and aligned in congruent fashion to make the twelve sides coincident. The edge portions are then joined along their respective twelve cut sides by a perimeter seam comprised of a series of easily sewn, substantially straight seams. There is no need to fold either of the panels prior to the formation of the perimeter seam and no need to orient the perimeter seam with respect to any fold line that may be used to facilitate storage of the uninflated air bag in an operative position within the vehicle.

It is still another object of this invention to provide an inflatable restraint cushion that, in another embodiment, is comprised of a single panel of fabric comprised of two congruent polygonal lobes that share a common uncut side. The two polygonal lobes are each in the shape of either a regular dodecagon or an Alternating Side Length dodecagon, where the number of sides in each lobe is twelve, but where each lobe has eleven cut sides. During assembly of the air bag, the two lobes are folded along an axis coinciding with the uncut twelfth side shared by the two polygons, and superimposed to form a flat, layered, polygonal structure with an aligned, congruent perimeter comprised of twelve straight sides, of which eleven are comprised of coincident cut edges. The folded polygonal structure is seamed or otherwise joined together along the eleven cut sides by sewing or other suitable techniques. Because the shared side of the polygonal structure comprising the twelfth side is uncut fabric, seaming along this side may be regarded as optional. Although seaming operations usually use sewing, it is contemplated that if coated or other suitable fabrics are used, the coincident cut edges of the two lobes can be welded or otherwise secured together by techniques known to those skilled in the art.

Applicable to each embodiment described above, it is contemplated that additional layers of fabric or other materials may be interposed or placed alongside one or both of the layers, either fully or partially, as the specific design may dictate. Upon appropriate inflation, the resulting flat cavity will form a restraint cushion or air bag that, when incorporated into an appropriate air bag system, is suitable for protecting the occupants of a vehicle involved in a collision.

In accordance with one aspect of the present invention, a method for forming the inflatable cushion of the present invention from two separate polygon-shaped panels is provided. This method comprises the steps of: (a) cutting from a fabric blank a first fabric panel in the shape of a regular or Alternating Side Length dodecagon; (b) cutting from a fabric blank a second fabric panel in the shape of a dodecagon that is congruent to the first fabric panel; (c) superimposing the first and second panels in congruent fashion, thereby forming a twelve-sided, layered polygonal structure in which the respective cut sides of each polygon are coincident; and (d) joining or sealing together along each of the coincident cut sides of the polygonal structure.

In accordance with another aspect of the present invention, a method for forming the inflatable cushion of the present invention from a single panel is provided. This method comprises the steps of: (a) cutting from a fabric blank a single panel having a dual-lobed shape comprised of a pair of congruent, twelve-sided polygons that share a common uncut side, each lobe thereby having the shape of a dodecagon having eleven cut sides and a twelfth uncut side along which it is seamlessly joined to the other lobe; (b) folding this dual-lobed panel along an axis that coincides with the uncut twelfth side shared by the pair of dodecagons, thereby aligning each of the eleven cut sides of each lobe with the corresponding cut side of the other lobe to form a perimeter substantially comprised of a layered polygonal structure in which the two lobes are superimposed in congruent fashion; and (c) joining or sealing together along each of the coincident cut sides of the polygonal structure.

Both the cutting and sealing operations may be achieved by manual, automated, or any other methods known by those skilled in the art. As is conventionally done, suitable holes may be cut in the rear panel or lobe to form gas inlet means, gas ventilation means, or for other purposes. It should be noted that various other structural devices or reinforcements may be incorporated into the design of the air bag which may result in the resulting polygonal structure or cushion having more than two layers.

BRIEF DESCRIPTION OF THE DRAWINGS

These and other features of the invention will become more apparent from the following detailed description of the preferred embodiments of the invention, when read in conjunction with the accompanying drawings in which:

FIG. 1 shows a cut-away view of an inflatable cushion restraint, such as that of the present invention, in deployment between the driver and the steering column;

FIG. 2 shows an arrangement of circular panels on a fabric blank, exemplifying the prior art;

FIG. 3 shows an arrangement of closely adjacent panels, each having the shape of a regular dodecagon, on a fabric blank in accordance with the teachings herein;

FIG. 3A shows the panels of FIG. 3 arranged as separate but contiguous panels having coincident sides on a fabric blank in accordance with the teachings herein;

FIG. 3B shows a group of dual-lobed panels, each of which is in the shape of a pair of the dodecagons of FIG. 3 that are in abutting relationship along a common side, on a fabric blank in accordance with the teachings herein;

FIG. 4 shows an air bag constructed from the panels of FIG. 3.

FIG. 5 shows an arrangement of separate but contiguous panels in the shape of an Alternating Side Length dodecagon, having a plurality of coincident sides, on a fabric blank in accordance with the teachings herein; and FIG. 6 shows an air bag constructed from the panels of FIG. 5.

DETAILED DESCRIPTION

Turning now to the drawings, FIG. 1 shows generally an air bag 10 for use in conjunction with an air bag system comprising an inflator 12 to protect a vehicle driver 14 from impacting against a steering wheel 16 in the event of a collision. Air bag 10 may be stored conventionally, i.e., in folded form within the central column of steering wheel 16, prior to deployment. For purposes of exposition, the panel that faces the driver following inflation shall be referred to as the front or face panel, and the panel that, following deployment, faces the steering wheel of the vehicle shall be referred to as the back or rear panel. As will be appreciated by those of ordinary skill in the art, suitable holes may be cut in the rear panel for the introduction and venting of the inflation media, with the location and size of the inflator and vent holes being determined by conventional design criteria. Furthermore, hub configurations, including size and number of doublers, heat shields, reinforcements, or other features known to those skilled in the art may be used in accordance with conventional teachings.

Air bag 10 preferably is formed from the superposition of a face panel and a congruent rear panel, each of which is shaped in the form of a polygon having twelve sides. This is in contrast to driver's side air bags that are conventionally formed from panels that are circular in shape. As shown in FIG. 2, the use of circular panels results in significant fabric waste because of the limited degree to which a plurality of circular panels 18 can be arranged in close proximity on fabric blank 20. The fabric blank waste (defined herein as the fabric between the indicated panel cutout areas within fabric blank 20, and otherwise referred to as the inter-panel fabric) that is associated with using circular panels results in a significantly higher cost—in excess of ten percent in some cases—for each finished circular air bag. In addition, because each individual panel 18 must be cut separately from blank 20, an additional cutting efficiency may be gained in the practice of the instant invention, as described herein.

Both the cutting and sealing operations may be achieved by manual, automated, or any other methods known by those skilled in the art. As is conventionally done, suitable holes may be cut in the rear panel or lobe to form gas inlet means, gas ventilation means, or for other purposes. It should be noted that various other structural devices or reinforcements may be incorporated into the design of the air bag that may result in the resulting cushion having more than two layers at various locations on the panels.

Fabric blank 20 may be formed from any material suitable for use in an air bag. Potentially preferred materials may include woven fabrics or non-woven fabrics, films, and combinations or composites thereof. Woven fabric constructions of nylon, polyester, or other suitable natural or polymeric materials as are well known to those skilled in the art may be preferred. Fabrics formed from nylon 6, 6 have been found to be particularly suitable. The fabrics may be coated or uncoated, and, in connection with one embodiment disclosed herein, the face panel and rear panel each may be cut from a different type of fabric, provided their relative size and shape are in accordance with the teachings herein. By way of example only and not limitation, the face panel may be a coated or very low permeability uncoated fabric while the rear panel is a higher permeability material so as to facilitate venting immediately following inflation.

To form air bag 10 in accordance with one embodiment of this invention, a face panel and a separate rear panel are inscribed within the area of a suitable fabric blank 20, as shown in FIGS. 3, 3A, or 5. It should be understood that if the face and rear panels are to be made from different fabric materials, separate blanks 20, each comprised of the desired respective fabric, would be used to form multiple face or rear panels, respectively arranged as indicated in the Figures. As can be seen, by forming the panels in the shape of a regular dodecagon 22 or an Alternating Side Length dodecagon 32, as depicted in FIGS. 3, 3A, and 5, the inter-panel fabric area may be minimized, thereby tending to minimize the fabric in blank 20 that is not incorporated into a panel. In addition to minimizing the amount of such inter-panel fabric, the use of a dodecagon panel shape allows for economies of cutting. If the panels 22, 32 are placed on the fabric blank in contiguous or abutting relation, i.e., with coincident sides or edges, then the cutting of one panel edge serves to cut the edge of the contiguous panel. This feature is depicted in FIGS. 3A and 5, which show, respectively, regular dodecagons 22 and Alternating Side Length dodecagons 32 that individually are in contiguous relation.

Following the cutting of two congruent panels that will become the face and rear panels of the fabricated air bag, the two individual panels 22 or 32 are superimposed in congruent fashion. Each of the panels 22 or 32 lie flat and their respective cut edges coincide and form a common, flat peripheral edge that can be easily joined without having to accommodate folds, gatherings, or other geometric irregularities in the fabric. The panels (22 or 32) are joined by seaming slightly inboard of their commonly aligned outer edges using any suitable type of stitching, or being otherwise secured or fused using attachment means along or adjacent to their commonly aligned edge portions, to form an inflatable closed volume capable of use in a vehicle air bag system. The perimeter seam 31, 35 is shown in FIG. 4 and FIG. 6, respectively, as part of regular dodecagon air bag 30 and Alternating Side Length dodecagon air bag 34, with each perimeter seam 31, 35 having the shape of the polygonal panel on which it is used.

Alternatively, an inflatable cushion may be fabricated from a single panel of fabric in the shape of a pair of abutting congruent twelve-sided polygons, forming a dual-lobed panel 24 such as depicted in FIG. 3B. In this embodiment, one of the polygonal lobes is folded over onto the opposing polygonal lobe, in clamshell fashion, along the common or shared side 29 between the two polygons comprising the lobes. This forms a two layer structure in which the top panel portion and the bottom panel portion have their respective cut edges or sides aligned, i.e., coincident. These two portions, which ultimately become the face and rear of air bag 30, are then joined along their respective perimeters by being sewn slightly inboard of their commonly aligned outer edges using any suitable kind of stitching, or being otherwise secured or joined using attachment means along or adjacent to their commonly aligned outer edges, to form inflatable cushion 30. Common or shared side 29 comprising the common boundary between the lobes contains no cut edges, and stitching or otherwise securing along shared side 29 is therefore optional, depending upon the design of the final air bag.

It should be noted that, although not shown in the Figures, the embodiment represented by dual-lobed panel 24 of FIG. 3B can be employed with Alternating Side Length dodecagons, provided that the pair of polygons upon which the design is based (1) are congruent, (2) are abutting (i.e., share a common side) and (3) are mirror images about such shared side 29, so as to have coincident sides or edges when folded about shared or common side 29.

This invention describes panels 22, 32 based upon twelve-sided congruent polygons. The various Figures illustrate arrangements of panels based upon regular dodecagons 22 or Alternating Side Length dodecagons 32, either separate or contiguous, on a fabric blank 20. As can be easily observed from FIG. 5, panels 32 based upon Alternating Side Length dodecagons may be most preferred because they can be closely aligned on fabric blank 20, resulting in the smallest amount of fabric waste per blank, yielding the lowest cost per unit. However, the inter-panel fabric resulting from the use of regular dodecagons 22 (FIG. 3) that might otherwise be classified as waste may be relatively easy to utilize in other steps in the fabrication of an air bag as reinforcing panels or other attachments, and therefore may be preferred for certain air bag designs.

EXAMPLE

Fabric Blank 1 was made of suitable air bag material, having a width of 1909 millimeters and a length of 6180 millimeters. On Blank 1, circular panels having a diameter of 710 millimeters were inscribed. The circular panels were arranged in closely adjacent relation on Blank 1. Twenty-three circular panels were inscribed in Blank 1, resulting in the creation of 11.5 airbags. Fabric utilization using circular panels was 77%, where the fabric utilization was measured only by the amount of fabric utilized in the production of circular panels. The volume of the finished circular air bag was 60 liters (when inflated without internal tethers).

Fabric Blank 2 was made of suitable air bag material, having a width of 1909 millimeters and a length of 6180 millimeters. On Blank 2, panels having the shape of a regular twelve-sided polygon with a side length of 188 millimeters were inscribed. The regular dodecagon panels were arranged on Blank 2, such that between two to six sides of each panel were coincident with sides of neighboring panels. Twenty-three regular twelve-sided polygonal panels were inscribed in Blank 2, resulting in the creation of 11.5 airbags. Fabric utilization using regular dodecagon panels was 78%, where the fabric utilization was measured only by the amount of fabric utilized in the production of the panels. The volume of the finished regular dodecagon air bag was 60 liters (when inflated without internal tethers).

Fabric Blank 3 was made of suitable air bag material, having a width of 1909 millimeters and a length of 6180 millimeters. On Blank 3, panels having the shape of Alternating Side Length dodecagons were inscribed. The side lengths of the Alternating Side Length dodecagons were 250 millimeters and 127 millimeters. The Alternating Side Length dodecagons were arranged on Blank 3, such that between two to six sides of each panel were coincident with sides of neighboring panels. Twenty-six Alternating Side Length dodecagons were inscribed in Blank 3, resulting in the creation of 13 airbags. Fabric utilization using Alternating Side Length dodecagon panels was 87%, where the fabric utilization was measured only by the amount of fabric utilized in the production of the panels. The volume of the Alternating Side Length dodecagon air bag was 60 liters (when inflated without internal tethers).

These results are summarized in the Table that follows.

TABLE

| Panel Shape | Volume | # of Panels/Blank | % Fabric Used |
|---|---|---|---|
| Circular | 60 liters | 23 | 77 |
| Regular 12-sided polygon | 60 liters | 23 | 78 |
| Alternating Side Length dodecagon | 60 liters | 26 | 87 |

It is clear that using panels having twelve sides results in a finished air bag that, when inflated, closely resembles a circle, the shape largely regarded as optimal in terms of design configuration. This finished shape is achieved with the twelve-sided panels of the present invention. Moreover, the desired volume is achieved with improved fabric utilization and improved efficiencies of cutting, folding, and joining. Fabric utilization is improved by approximately 10% by substituting Alternating Side Length dodecagons for the circular panels of the prior art. For this reason, twelve-sided panels are preferable to the circular panels of the prior art.

In accordance with conventional practice, the resulting cushion, made with either two separate panels or the single, dual-lobed panel of this invention, may be turned "inside-out" to place the fabric panel edges comprising the seam on the inside of the cushion. It should also be noted that the fabric web from which the air bag panel is to be cut may be oriented with respect to the cutting means in various ways. Orienting a web of an appropriate woven fabric so that the resulting panel axis is at a 45-degree angle to the warp and fill directions of the fabric will give the greatest strength to the inflated air bag. However, it may be desirable to orient the fabric in other ways in order to maximize the number of panels that can be cut from a given web of air bag fabric. Use of panels based on straight-sided dodecagons, as in the instant invention, offers the additional advantage of aligning one or more of the sides with an edge of the fabric blank, thereby providing the opportunity for a more efficient arrangement of the individual panels on the fabric blank.

Having described the principles of the invention in the form of the foregoing exemplary embodiments, it should be understood by those skilled in the art that the invention can be modified in arrangement and detail without departing from such principles, and that all such modifications falling within the spirit and scope of the following claims are intended to be protected hereunder.

I claim:

1. An inflatable fabric cushion for use in a vehicle occupant restraint system, said cushion having a face panel and a rear panel, wherein said face panel is in the shape of a first twelve-sided polygon and said rear panel is in the shape of a second, congruent twelve-sided polygon, said face panel and said rear panel being joined along the respective coincident cut edges.

2. The cushion of claim 1 wherein said face panel is in the shape of a first regular twelve-sided polygon and said rear panel is in the shape of a second, congruent regular twelve-sided polygon.

3. The cushion of claim 1 wherein said face panel and said rear panel are in the shape of congruent Alternating Side Length dodecagons, said dodecagons having six sides with a first length and six sides with a second length, said second length being approximately twice as long as said first length, and wherein said sides with the first length are positioned alternately between said sides with the second length, such that no side with the first length is adjacent to another side with the first length.

4. The cushion of claim 1, said cushion having said face panel and said rear panel, wherein said face panel and said rear panel are congruent and abutting twelve-sided polygons that are contiguous along a common uncut side, thereby forming a figure having two lobes, said cushion being formed from the folding of said lobes about said uncut side.

5. The cushion of claim 4 wherein said dual-lobed figure is comprised of two congruent and abutting regular twelve-sided polygons.

6. The cushion of claim 4 wherein said dual-lobed figure is comprised of two congruent and abutting Alternating Side Length dodecagons.

7. A fabric blank having inscribed therein at least one pair of adjacent and congruent polygon-shaped panels for use in air bag construction, each of said adjacent panels in said pair being comprised of at least one twelve-sided polygon, wherein one of said polygon-shaped panels comprising said pair of panels has at least one side parallel to a side of said other polygon-shaped panel comprising said pair of panels.

8. The fabric blank of claim 7, having inscribed therein a plurality of adjacent and congruent polygon-shaped panels for use in air bag construction, each of said panels having the shape of a regular twelve-sided polygon, and wherein each of said panels has a plurality of sides that are coincident with sides of said adjacent panels.

9. The fabric blank of claim 8 wherein the number of said sides of each of said panels that are coincident with said adjacent panels is between two and six.

10. The fabric blank of claim 7 wherein said twelve-sided polygon is a regular polygon.

11. The fabric blank of claim 7 wherein said twelve-side polygon is an Alternating Side Length dodecagon.

12. The fabric blank of claim 7, wherein said adjacent and congruent polygon-shaped panels are abutting and contiguous along a common uncut side, thereby forming a dual-lobed panel.

13. The fabric blank of claim 12 wherein said adjacent panels are comprised of two congruent and abutting twelve-sided regular polygons.

14. The fabric blank of claim 13 wherein a plurality of dual-lobed panels are arranged on said blank, each panel having at least one side parallel to a side of an adjacent panel.

15. The fabric blank of claim 12 wherein said adjacent panels are comprised of two congruent and abutting Alternating Side Length dodecagons.

16. The fabric blank of claim 15 wherein a plurality of dual-lobed panels are arranged on said blank, each panel having at least one side coincident with a side of an adjacent panel.

17. A process for manufacturing an inflatable restraint cushion, said process comprising the steps of: (a) cutting a first twelve-sided panel and a second, congruent twelve-sided panel from a fabric blank; (b) superimposing said first panel and said second panel in congruent fashion, thereby causing said twelve sides of said first panel and said twelve sides of said second panel to coincide; and (c) securing together said first panel and said second panel by forming a perimeter seam along each of their respective coincident sides.

18. The process of claim 17 wherein said panels are Alternating Side Length dodecagons.

19. The process of claim 17 wherein said first panel and said second panel are cut from different fabric blanks.

20. The process of claim 17 wherein said first panel and said second panel are arranged on said fabric blank so that at least one of said twelve sides of said first panel and at least one of said twelve sides of said second panel are closely adjacent to each other and are substantially parallel.

21. The process of claim 17 wherein said first panel and said second panel are arranged on said fabric blank so that at least one of said twelve sides of said first panel and at least one of said twelve sides of said second panel are coincident.

22. A process for manufacturing an inflatable restraint cushion comprising the steps of: (a) cutting from a fabric blank at least one panel in the shape of two congruent, twelve-sided polygons that are contiguous along a common uncut side and that form a dual-lobed panel, each lobe having the shape of a twelve-sided polygon having eleven cut sides and an uncut twelfth side which is coincident with a side of the other lobe; (b) folding said dual-lobed panel along said uncut coincident side and superimposing said two polygonal lobes in congruent fashion, thereby causing each of said cut sides of each lobe to coincide with the corresponding cut side of the other lobe; and (c) securing together said first lobe and said second lobe by forming a perimeter seam along each of their respective coincident cut sides.

23. The process of claim 22 wherein said twelve-side polygons are Alternating Side Length dodecagons.

24. The process of claim 22 wherein a first panel and a second panel are cut from said fabric blank, and wherein said first and said second panels are arranged on said fabric blank so that at least one of said sides of said first panel is substantially parallel to at least one of said sides of said second panel.

25. The process of claim 22 wherein a first panel and a second panel are cut from said fabric blank, and wherein said first and said second panels are arranged on said fabric blank so that at least one of said sides of said first panel is coincident with at least one of said sides of said second panel.

* * * * *